United States Patent [19]

Hanada

[11] 4,411,331
[45] Oct. 25, 1983

[54] AUTOMOTIVE STEERING COLUMN COVER

[75] Inventor: Hidekazu Hanada, Shizuoka, Japan

[73] Assignee: Nihon Plast Co., Ltd., Shizuoka, Japan

[21] Appl. No.: 265,079

[22] Filed: May 19, 1981

[30] Foreign Application Priority Data

May 21, 1980 [JP] Japan ................... 55-69904

[51] Int. Cl.³ .............................................. B62D 25/14
[52] U.S. Cl. ........................................ 180/78; 74/492; 180/90; 403/12
[58] Field of Search ................. 74/492, 495, 552, 558; 150/52 K, 52 L, 52 M; 174/175; 180/70, 78, 90; 280/779, 780, 750; 403/12, 23, 24, 344, DIG. 4, DIG. 10; 248/218.4, 226.4, 544; 296/70, 31 P, 39 R

[56] References Cited

U.S. PATENT DOCUMENTS 3,090,826  5/1963  Cochran ........................... 174/175
3,167,974  2/1965  Wilfert ............................. 74/552
4,241,937 12/1980  Eggen et al. ..................... 280/750

*Primary Examiner*—Joseph F. Peters, Jr.
*Assistant Examiner*—Pierre Huggins
*Attorney, Agent, or Firm*—Armstrong, Nikaido, Marmelstein & Kubovcik

[57] ABSTRACT

An automotive steering column cover has upper and lower cover members both made of a plastic material. The cover members define therein downwardly and upwardly directed recesses, respectively, and are adapted to abut each other along the edges of the recesses to form a hollow assembly which surrounds an associated steering shaft. At least the lower cover member has an integral clip extending therefrom to the steering shaft. The clip has a generally C-shaped free end defining an opening of a dimension slightly less than the diameter of the steering shaft whereby the C-shaped end of the clip can be snapped onto the steering shaft by the resiliency of the plastic material to mechanically connect the cover member to the steering shaft. The lower cover member therefore can be easily mounted on the steering shaft.

9 Claims, 5 Drawing Figures

AUTOMOTIVE STEERING COLUMN COVER

BACKGROUND OF THE INVENTION

1. Field of the Invention

The present invention relates to an automotive steering column cover.

2. Description of the Prior Art

The conventional automotive steering column cover had a lower cover member secured to an associated steering column solely by means of screws extending through the lower cover member from the under surface thereof into a member fixed to the steering column. In assemblying the column cover, a workman was required first to upwardly support and hold the lower cover member in position by one hand and use the other hand to tighten screws inserted into screw holes from the underside of the lower cover member. Thus, the lower cover member was difficult to mount on the steering column.

SUMMARY OF THE INVENTION

It is an object of the present invention to provide an improved automotive steering column cover which can be easily mounted on an associated automotive steering shaft.

According to the present invention, there is provided a steering column cover comprising an upper cover member defining therein a downwardly directed recess, a lower cover member defining therein an upwardly directed recess, said upper and lower cover members being assembled together so that the members abut each other along the edges of said recesses to form a generally hollow assembly having opposite ends defining therein openings for a steering column extending through said hollow assembly, at least one of said upper and lower cover members being formed thereon with at least one integral clip extending radially inwardly to grip said steering column to mechanically connect said one cover member to said column.

The present invention will be described by way of example with reference to the accompanying drawings.

DESCRIPTION OF PREFERRED EMBODIMENTS

Figure 1:
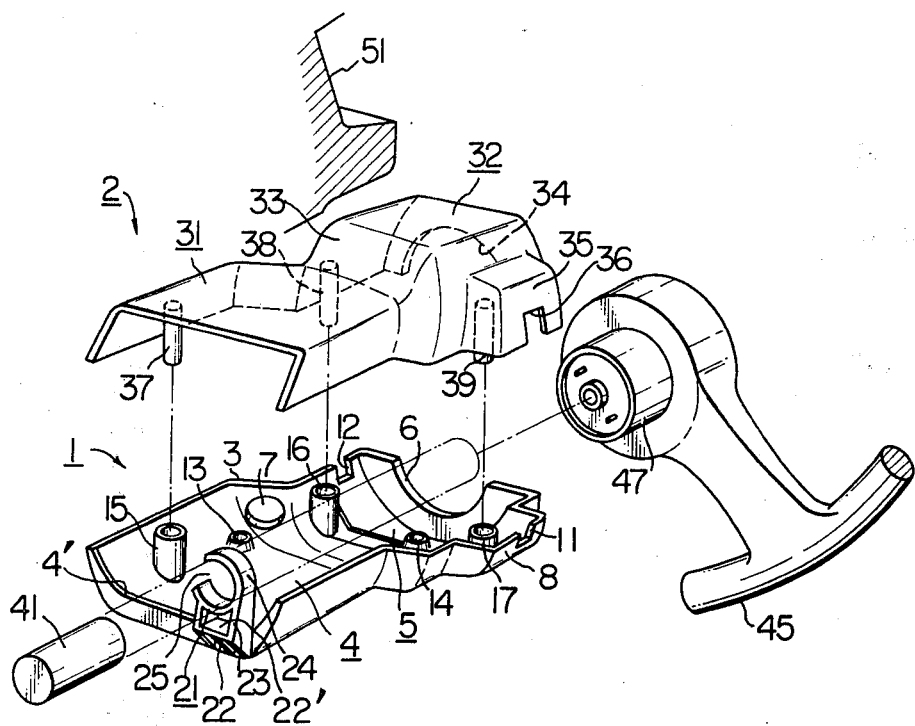
FIG. 1 is a perspective view of upper and lower cover members of an embodiment of an automotive steering column cover according to the present invention with the cover members being shown in disassembled positions.
Figure 2:
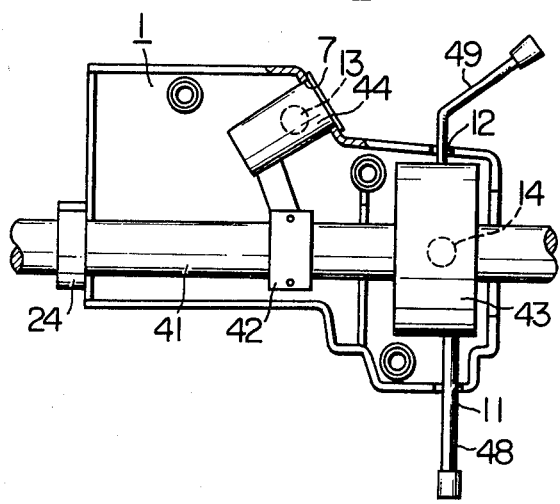
FIG. 2 is a top plan view of the lower cover member and an associated steering column with a part of the cover member being cut away.

Referring first to FIGS. 1 and 2, a steering column cover comprises a lower cover member 1 and an upper cover member 2.

The lower cover member 1 is made of a plastic material and defines therein an upwardly directed recess. The cover member 1 is divided by a laterally offset portion 3 into rear and front pocket sections 4 and 5. An arcuate cutout or notch 6 is formed in the end wall of the cover member 1 adjacent to the front pocket section 5. A circular opening 7 is formed in the laterally offset portion 3. One of the sides of the front pocket section 5 is laterally buldged to form a lateral projection 8. The outer wall of the projection 8 and the other side of the front pocket section 5 are formed therein with notches 11 and 12, respectively. Screw holes 13 and 14 are formed in the bottom walls of the rear and front pocket sections 4 and 5, respectively. Generally cylindrical projections 15, 16 and 17 are integrally formed on the bottom walls of the rear and front pocket sections 4 and 5 and on the bottom wall of the lateral projection 8, respectively. These projections define therein through-holes for screws (not shown) for securing the lower and upper cover members 1 and 2 together. The rear end of the lower cover member 1 is cut out as at 4'.

The lower cover member 1 is provided with an integral clip 21 formed on and upwardly extending from the edge of the cutout 4' in the rear end of the cover member 1. The clip 21 includes three inclined legs or ribs 22 extending rearwardly from the edge of the cutout 4' in the rear end of the cover member 1 and having tops connected together by a substantially horizontal web 22'. A pair of upwardly extending side walls 23 connect the side edges of the web 22' with a generally C-shaped gripper portion 24 having a laterally directed opening 25 of a dimension slightly less than the diameter of a steering column 41 on which the cover member 1 is to be mounted, as will be described later.

The upper cover member 2 is also made of a plastic material and defines therein a downwardly directed recess. The cover member is divided by a stepped section 33 into two pocket sections 31 and 32 respectively corresponding to the pocket sections 4 and 5 of the lower cover member 1. An arcuate notch or cutout 34 corresponding to the cutout 6 in the lower cover member 1 is formed in the front end of the front pocket section 32. One of the sides of the pocket section 32 is laterally buldged to form a lateral projection 35 corresponding to the lateral projection 8 of the lower cover member 1. The outer wall of the lateral projection 35 is formed therein with a notch 36 corresponding to the notch 11 in the lower cover member 1. Generally cylindrical projections 37, 38 and 39 are integrally formed on the inner surfaces of the tops of the pocket sections 31 and 32 and on the inner surface of the top of the lateral projection 35 at positions to be aligned with the projections 15–17 of the lower cover member 1. The projections 37–39 define therein screw holes not shown in the drawings.

In mounting the lower and upper cover members 1 and 2, a mounting 42 for an ignition switch and steering lock 44 and an enclosure 43 for various kinds of switches (not shown) are secured to the steering column 41 in conventional manner. A steering wheel 45 is then fixed to the end of a steering shaft (not shown), the steering shaft extending through the column 41 in conventional manner.

Then, the lower cover member 1 is provisionally mechanically connected to the steering column 41 in such a manner that the opening 25 of the C-shaped gripper section 24 of the clip 21 is urged against the steering shaft 41 to cause the gripper section 24 to be snapped onto the shaft 41 and frictionally and resiliently grip the shaft by the resiliency of the plastic material from which the cover member 1 is made. Thus, the clip 21 acts to provisionally hold the lower cover member 1 on the steering column 41.

Thus, the workman is not required to support the lower cover member 1 by one hand during mounting operation but can easily insert screws through the screw holes 13 and 14 in the cover member 1 into screw holes (not shown) in the ignition switch and steering lock 44 and the switch enclosure 43 to secure the cover member 1 to the steering column 41. In the position in which the lower cover member 1 is fixed to the steering column 41, the steering column 41 extends through the recess defined in the lower cover member. The arcuate notch 6 accommodates a boss 47 formed on the steering wheel 45, while the notches 11 and 12 accommodate levers 48 and 49 extending radially outwardly from the switch enclosure 43. These levers 48 and 49 are known as actuators for switches such as wiper switch and turn signal switch housed in the switch enclosure. The circular opening 7 receives the outermost end portion of the ignition switch and steering lock 44.

Then, the upper cover member will be placed over the lower cover member 1 and the steering column 41 so that the edges of the recesses in the upper and lower cover members abut each other. In this position, the cylindrical projections 15, 16 and 17 of the lower cover member 1 are aligned with the projections 37, 38 and 39 of the upper cover member 2, respectively. Screws (not shown) are then inserted from the underside of the lower cover member 1 into the screw holes formed in the aligned pairs of the projections and are then tightened to fasten the upper cover member 2 to the lower cover member 1.

Reference numeral 51 designates an instrument panel.

Another or second embodiment of the invention will be described with reference to FIG. 3 in which parts similar to those of the first embodiment are designated by similar reference numerals. The difference only will be described hereunder.

Figure 3:
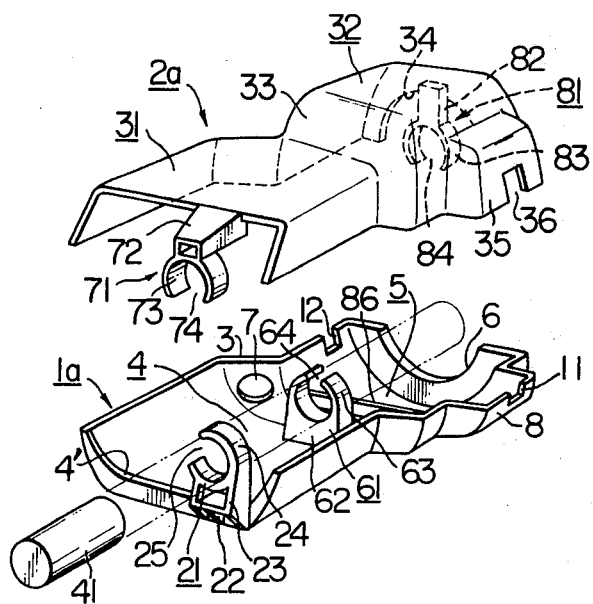
FIG. 3 is generally similar to FIG. 1 but illustrates another embodiment of the present invention.

The second embodiment shown in FIG. 3 is not provided with the screw holes 13 and 14 and the cylindrical projections 15–17 and 37–39 of the first embodiment shown in FIGS. 1 and 2. Instead, the lower cover member 1a of the second embodiment is provided with a second clip 61 in addition to a first clip 21 similar in structure to the clip 21 of the first embodiment. The second clip 61 is disposed centrally of the lower cover member 1 and integral with the bottom of the recess defined in the cover member 1a. The clip 61 includes an upstanding leg section 62 and an upper gripper section 63 of generally C-shaped profile defining an upwardly directed opening 64 of a dimension slightly less than the diameter of an associated steering column 41.

The upper cover member 2a is provided with third and fourth clips 71 and 81 integral with the cover member 2a. The clips 71 and 81 extend radially inwardly from the rear end of the cover member 2a and from the inner surface thereof adjacent to the front end of the cover member, respectively. The clips 71 and 81 respectively include leg sections 72 and 82 and lower gripper sections 73 and 83 of generally C-shaped profile defining downwardly directed openings 74 and 84 of a dimension slightly less than the diameter of the steering column 41.

The lower cover member 1a can be mounted on the steering column 41 in such a manner that the first clip 21 is laterally urged against the steering column and snapped onto the column by the resiliency of the plastic material and then the second clip 61 is urged upwardly against the steering shaft 41 and snapped onto the shaft also by the resiliency of the plastic material whereby the lower cover member 1a is mechanically connected to the steering shaft 41. The lower cover member 1a is further provided with a lateral rib 86 integral with and formed on the inner surface of the lower cover member. When the cover member 1a is mounted on the steering column 41 by means of the clips 21 and 61, the rib 86 is engaged with the switch enclosure 43 (see FIG. 2) to hold the cover member 1a against rotation about the axis of the steering column 41.

The upper cover member 2a will then be placed over the lower cover member 1a and the steering column 41 so that the edges of the recesses defined in the upper and lower cover members abut each other. The upper cover member is then pressed downwardly to snap the third and fourth clips 71 and 81 onto the steering shaft 41 whereby the lower and upper cover members are assembled and united together by means of the clips 21, 61, 71 and 81 and the steering column 41 gripped by these clips. The four clips are arranged such that they are axially offset from each other when the two cover members are united together.

No screw is used to mount the cover members 1a and 2a of the second embodiment on the steering column 41. Thus, these cover members can be quite easily mounted on the steering column and can be easily united together.

Figure 4:
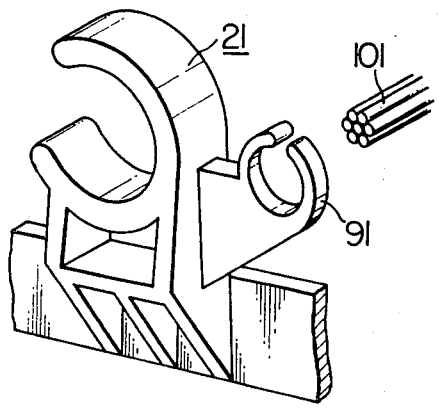
FIG. 4 and 5 are enlarged perspective views of modified clips of the lower cover member shown in FIG. 3.
Figure 5:
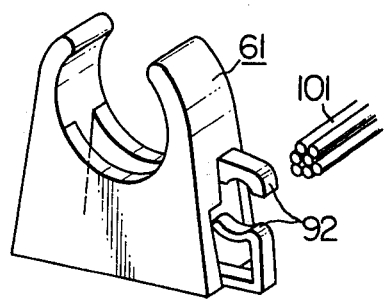

As shown in FIGS. 4 and 5, the lower cover member may be modified to include conductor holders 91 and 92 formed integrally with the clips 21 and 61 to hold bundles of conductors 101 extending from the switch enclosure 43 and from the ignition switch and steering lock 44, respectively. These conductor holders 91 and 92 are formed on one sides of the clips 21 and 61, respectively, and are generally C-shaped to permit the bundles of conductors 101 to be snapped into the holders through openings of "C".

As will be seen from the foregoing description, the present invention provides an improved steering column cover which can be easily mounted on an associated steering column.

What is claimed is:

1. A steering column cover comprising an upper cover member defining therein a downwardly directed recess, a lower cover member defining therein an upwardly directed recess, said upper and lower cover members being assembled together so that the members abut each other along the edges of said recesses to form a generally hollow assembly having opposite ends defining therein openings for a steering shaft extending through said hollow assembly, at least said lower cover member being formed thereon with at least one integral clip extending radially inwardly to grip said steering column to mechanically connect said one cover member to said column, said clip being generally C-shaped and having an opening of a dimension which is slightly smaller than the diameter of said steering column so that the clip can be snapped onto said steering column by the resiliency of the material from which said lower cover member is made.

2. A steering column cover comprising an upper cover member defining therein a downwardly directed recess, a lower cover member defining therein an upwardly directed recess, said upper and lower cover members being assembled together so that the members abut each other along the edges of said recesses to form a generally hollow assembly having opposite ends defining therein openings for a steering column extending through said hollow assembly, at least one of said upper and lower cover members being formed thereon with at least one integral clip extending radially inwardly to grip said steering column to mechanically connect said one cover member to said column, said upper and lower cover members being both formed thereon with clips integral with said cover members respectively and extending radially inwardly to grip said steering column to mechanically connect said cover members to said column.

3. A steering cover according to claim 1 or 2, wherein at least one of said upper and lower cover members is provided with a conductor support means integral with the clip of said one cover member.

4. A steering column cover according to claim 1, wherein said upper and lower cover members are further provided with means defining therein screw holes for screws for fastening said cover members together.

5. A steering column cover according to claim 1, 2 or 4, wherein at least one of said upper and lower cover members is made of a plastic material.

6. A steering column cover according to claim 3, wherein at least one of said upper and lower cover members is made of a plastic material.

7. A steering column cover according to claim 6, wherein said conductor support means comprises a holder adapted to support at least one conductor.

8. A steering column cover according to claim 2 wherein at least one of said upper and lower cover members is made of a plastic material and provided with said clip and said clip is generally C-shaped and has an opening of a dimension which is slightly smaller than the diameter of said steering column so that the clip can be snapped onto said steering column by the resiliency of said plastic material.

9. A steering column cover according to claim 2 wherein at least one of said upper and lower cover members is provided with a conductor support means integral with the clip of said one cover member, at least one of said upper and lower members is made of a plastic material and provided with said clip and said clip is generally C-shaped and has an opening of a dimension which is slightly smaller than the diameter of said steering column so that the clip can be snapped onto said steering column by the resiliency of said plastic material.

* * * * *